Feb. 18, 1964   H. L. BRODE   3,121,384
BLAST PROTECTION VALVE FOR UNDERGROUND INSTALLATION
Filed May 3, 1962   2 Sheets-Sheet 1

INVENTOR.
HAROLD L. BRODE
BY
ATTORNEYS

United States Patent Office 3,121,384
Patented Feb. 18, 1964

3,121,384
BLAST PROTECTION VALVE FOR UNDERGROUND INSTALLATION
Harold L. Brode, Santa Monica, Calif., assignor to the United States of America as represented by the Secretary of the Air Force
Filed May 3, 1962, Ser. No. 192,297
2 Claims. (Cl. 98—119)

The invention relates to a blast protection valve, and more particularly to a device to be placed in the opening of an underground installation for protection against high pressures and shock forces from nuclear blast occurring above ground, and permitting normal flow of exhaust or intake air under normal conditions.

The present designs for blast valves designed to underground installations from nuclear blast forces require elaborate moving parts usually remotely controlled, and require blast or nuclear explosion sensing elements which can lead to problems of timing. Such devices of necessity have a multiplicity of moving parts, are more subject to errors in construction and operation, and to miscalculation in problems of timing leading to too early or too late closing of the valve. Some require a long closing period which may cut off essential ventilation for the underground installation longer than necessary.

The device has protective possibilities against high shock over pressures from a nuclear blast, and prevents the blast force from reaching underground installations. When not subjected to energy conditions of blast pressures, the device permits the normal flow of exhaust air from the installation chamber, and the intake of air which will provide ventilation. Briefly stated, the invention consists of a wide-mouthed hose or flexible tube positioned in a horizontal underground passageway immediately beneath a vertical passageway leading to the surface of the ground. The tube may be of rubberized material, or other material having a degree of flexibility commensurate with a minimum shock expectancy, and a strength commensurate with high shock possibilities. One end of the tube conforms in cross section to the cross section of the passageway leading to the underground installation chamber, and is sealed to the internal surface of the passageway. A segment of the tube at the opposite end is flattened to an elliptical cross section. The tube is of sufficient length to extend along the horizontal passageway, and is positioned so that the flattened segment lies directly beneath the vertical passageway, and receives the incoming shock. The tube collapses and closes off the passageway before the shock wave can enter the mouth of the tube. This valve action is enhanced by the use of suitably located baffles, and a shock reflector chamber.

The present invention has provided a "fail-safe" and fool-proof device which has an absolute minimum of moving parts, avoids any power requirements whatsoever, obviates the necessity of electronics and sensitive mechanical components, and provides better reliability for a system which must always be ready to operate with millisecond response.

A further object of the invention consists in providing a blast-actuated valve which closes only as long as the external pressure remains too high for internal safety, and one which cannot be accidentally triggered.

A further object of the invention is the provision of a device as above noted which requires an absolute minimum of maintenance, and no remote control.

These and other advantages, features and objects of the invention will become more apparent from the following description taken in connection with the illustrative embodiment in the accompanying drawing, wherein.

Figure 1:
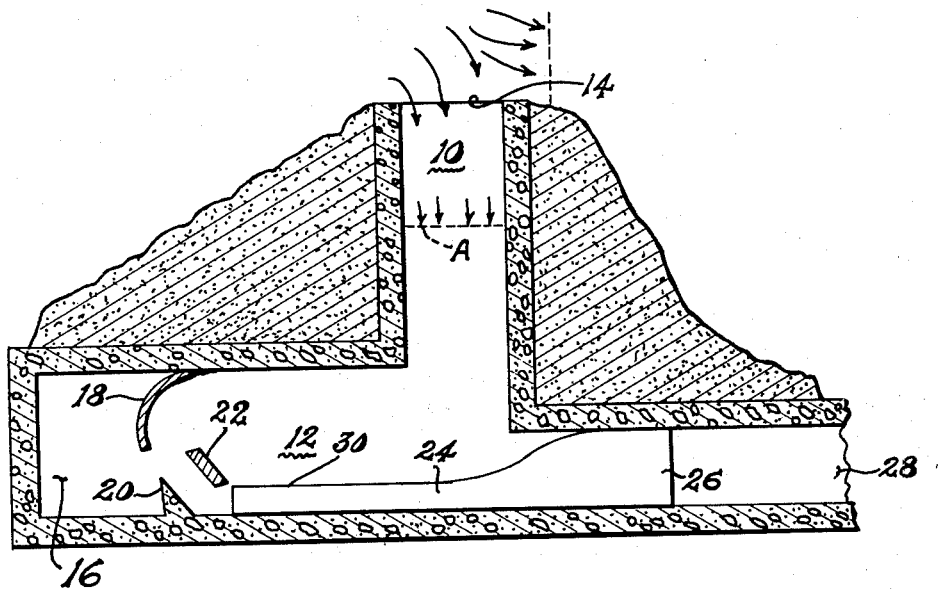
FIGURE 1 is a partial sectional view showing the opening of an underground installation with the protective device of the invention installed therein, and showing the blast pressure wave in the initial stages of its entrance to the underground chambers.

Referring more in detail to the drawings wherein like numerals represent like parts in the several figures. The device is comprised generally of two chambers 10 and 12 constructed of concrete or other suitable wall material. The passage 10 is vertically positioned and has a mouth 14 opening to ground surface. At its lower end the passageway or conduit 10 opens into the horizontal section 12 midway between its ends. The horizontal section 12 constitutes a valve chamber, and is itself divided into a delay chamber 16 and a conduit or passage 28, providing ventilation to the underground installation (not shown). The shock reflection delay chamber 16 is offset laterally from the vertical conduit 10. Devices for attenuating, interrupting and absorbing shock force may be provided. A frangible exhaust deflector 18 (FIGURE 1) may be attached to the top wall of the chamber 16. It extends downwardly and absorbs shock energy by shattering. Baffles are also provided to protect the inner opening of the valve device. These may be of any known and expedient forms. For example, a shock deflector 20 is built into the floor and forms a permanent portion of the wall structure. Other deflectors of any desired type, such as the one shown at 22, may be installed in the shock deflection chamber as found necessary. The deflector 22 may be mounted transversely to the longitudinal axis of chamber 12 and extend all or partly across the chamber having means (not shown) to secure it either to the side or top of chamber 12.

Figure 6:
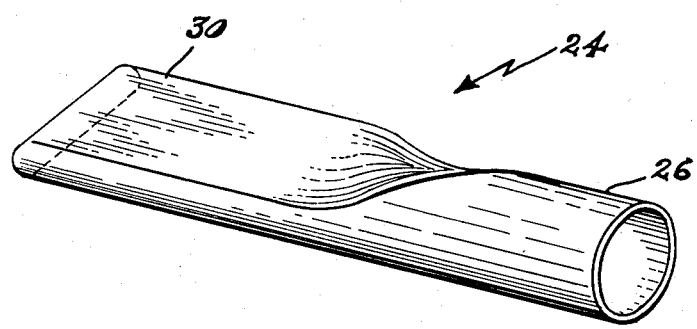
FIGURE 6 is a perspective view of the bladder valve per se.

The intrinsic invention resides in the heavy flexible tube device 24, which closes completely under shock pressure and opens as soon as external pressures have reached a safe level. The closing and opening are both effected with no mechanical or electrical devices whatsoever. The tube 24 is shown in detail in FIGURE 6. It comprises a heavy flexible tube element provided with a segment 26 of sufficiently large diameter at the opening so that it may be clamped, cemented or otherwise permanently secured into the internal surface of the portion 28 of passage 12. The passage 28 leads to an underground installation chamber (not shown). At the opposite end of the tube 24 a flattened segment 30 extends beyond the vertical entrance chamber 10 but not into the shock reflector delay chamber 16. The tube 24 under normal pressures is open at both ends, thus, providing the necessary ventilation for the underground installation under normal circumstance. The tube is so formed that calculated pressures entering the chamber 16 will cause complete collapse of the tube, and complete closing of the entrance so that no shock enters the installation. FIGURES 1, 2, 3, 4 and 5, at A, B, C and D, represent the progressive stages of the entering and retreating shock wave. In FIGURE 1, the wave front has entered the passage 10, and is progressing downward as shown at A.

Figure 2:
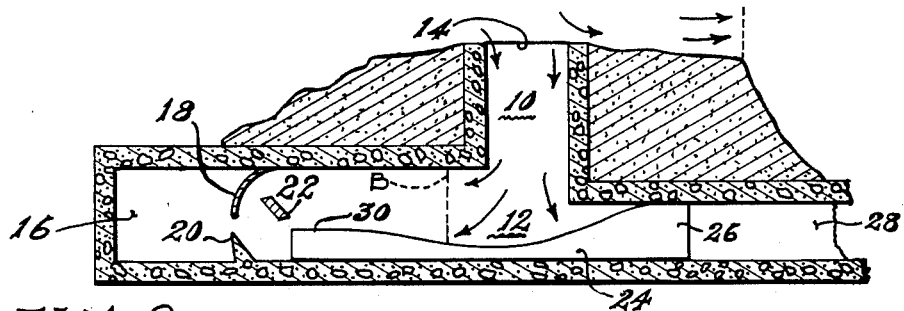
FIGURE 2 is a cross-sectional view of the underground installation as in FIG. 1 showing the progress of the blast pressure wave indicated by arrows and showing the initial effect on the valve device.
Figure 3:
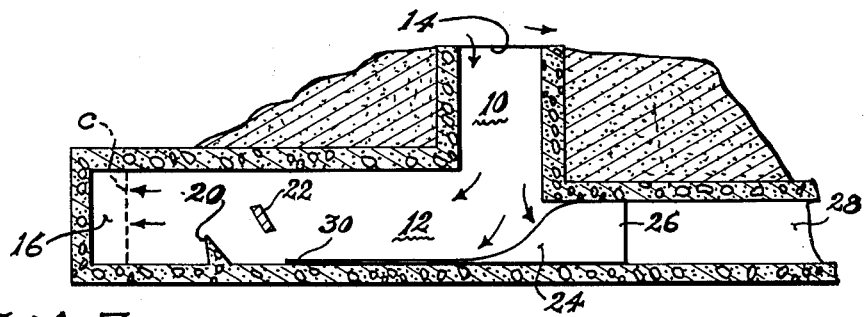
FIGURE 3 is a view similar to FIGS. 1 and 2 showing the further progress of the blast wave, the complete collapse of the valve device with the access opening to the installation completely closed off.
Figure 4:
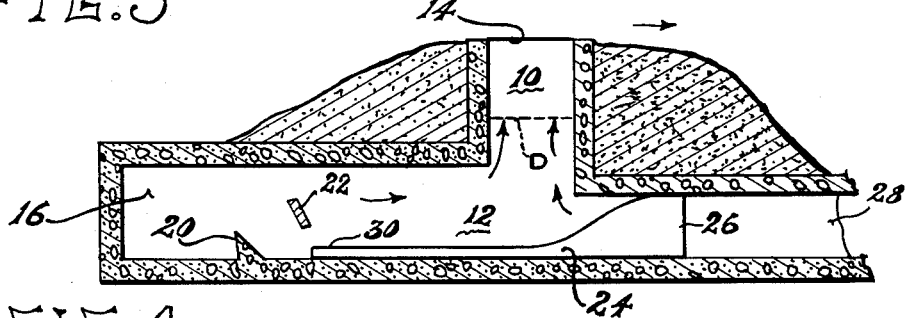
FIGURE 4 is a view of the device as in the preceding figures wherein the blast force has subsided and the pressure within the chamber is decreasing.
Figure 5:
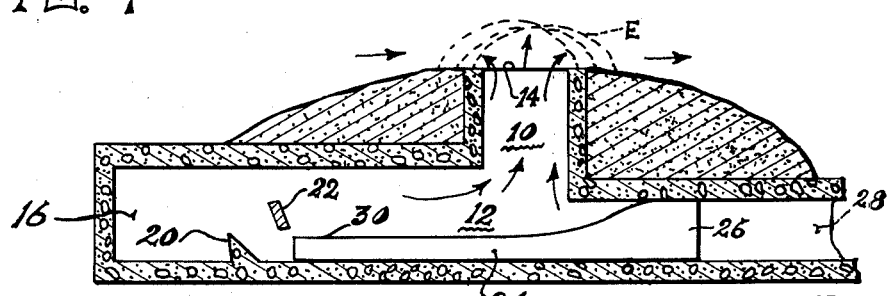
FIGURE 5 shows the condition of the valve returned to normal, with normal ventilation again established.

The valve tube is as yet untouched, and in normal, open position. In FIGURE 2, the wave front has made contact with the valve member, and effected the beginning of its collapse and is proceeding, as shown at B, into the delay chamber 16. In FIGURE 3, the complete collapse of the member 24 has been effected, the frangible baffle 18 has been broken, and the wave has progressed toward the end of the delay chamber 16, as shown at C. In FIGURE 4, the shock wave is receding upward in the vertical chamber 10, as shown at D, and the valve, responsive to the abatement of the pressure is opening. FIGURE 5 shows the shock wave emerging above ground and dispersing. The tubular member has opened to normal position, and ventilation has again been established.

It will be seen that the tube collapses and closes off the access conduit only under the action of the shock wave, as in FIGURE 2, and opens immediately as the pressure is relieved, no intermediate electronic or mechanical devices being necessary. Provision is made (chamber 16) to delay the reflection of the entering shock long enough for the rubberized tube or bladder 24 to have squeezed shut. This is for the purpose of preventing any of the blast force from entering the bladder valve 24.

Although the invention has been described with reference to a particular embodiment, it will be understood to those skilled in the art that the invention is capable of a variety of alternative embodiments within the spirit and scope of the appended claims.

I claim:

1. A blast activated device for the protection of underground installations from blast forces arising above ground, said device providing ventilation and access when blast forces are absent or abating, said device comprising walls defining a horizontally disposed underground chamber and a vertically positioned chamber opening to ground surface, the lower end of said vertical chamber communicating with said horizontally disposed chamber midway its extent, one end of said horizontally disposed chamber comprising a delay chamber, a valve for closing said chamber, and an access conduit opening through said valve to said underground installation, means for closing said valve, and thereby closing said access conduit directly by shock impact from shock blast originating above ground, said means comprising a flexible hollow tubular member disposed in said valve chamber insertable in said horizontally disposed underground chamber and secured at the periphery of one end thereof to the interior surface of the wall of said conduit in air sealed relationship and in such manner as to retain said end in opened condition, and allowing unimpeded communication between said installation and the surface atmosphere when shock blast forces are absent, the mid point of said tubular member lying directly below the downwardly opening end of said vertical chamber to receive the first shock force entering said vertical chamber from an above ground source, said tubular member being capable of total collapse under the impact of said shock force to completely close and maintain closed said conduit so long as shock force is exerted thereon, and having sufficient resilience to be capable also of reopening and reestablishing ventilation when and as said shock force is reduced.

2. In the device as claimed in claim 1, an exposed mouth on said tube baffles for protecting said exposed mouth, one baffle anchored in the walls of, and extending transversely across said chamber and disposed at an angle to the vertical and above said mouth for protecting said mouth from reflected shock forces, a second baffle attached to the floor of said delay chamber to protect the open mouth of said tubular member from reflected shock, and a frangible baffle introduced into said delay chamber for shock wave absorption.

References Cited in the file of this patent

UNITED STATES PATENTS

| | | |
|---|---|---|
| 657,007 | Richter | Aug. 28, 1900 |
| 2,749,833 | Hekelaar | June 12, 1956 |
| 3,085,491 | Ross | Apr. 16, 1963 |